United States Patent
Bostick et al.

(10) Patent No.: US 8,839,096 B2
(45) Date of Patent: Sep. 16, 2014

(54) MANAGEMENT OF ROTATING BROWSER CONTENT

(75) Inventors: James E. Bostick, Cedar Park, TX (US); John M. Ganci, Jr., Cary, NC (US); John P. Kaemmerer, Pflugerville, TX (US); David S. Wenk, Byron Center, MI (US)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 12/353,605

(22) Filed: Jan. 14, 2009

(65) Prior Publication Data

US 2010/0180188 A1 Jul. 15, 2010

(51) Int. Cl.
*G06F 17/22* (2006.01)
*G06F 15/16* (2006.01)
*G06F 17/30* (2006.01)

(52) U.S. Cl.
CPC .............................. *G06F 17/30899* (2013.01)
USPC ........... 715/244; 715/738; 715/760; 715/823; 709/203; 709/217

(58) Field of Classification Search
USPC .......... 709/203, 204, 202, 217, 219; 707/721, 707/E17.014, E17.114, 999.007; 715/205, 715/781, 234, 207, 206, 244, 273, 738, 760, 715/762, 763, 823; 705/14, 14.41, 14.73, 705/14.4
See application file for complete search history.

(56) References Cited

U.S. PATENT DOCUMENTS

| | | | |
|---|---|---|---|
| 6,317,761 B1 * | 11/2001 | Landsman et al. | 715/205 |
| 6,892,181 B1 * | 5/2005 | Megiddo et al. | 705/14.41 |
| 7,028,032 B1 * | 4/2006 | Diedrich et al. | 1/1 |
| 7,617,458 B1 * | 11/2009 | Wassom et al. | 715/760 |
| 2002/0191032 A1 * | 12/2002 | Brown et al. | 345/838 |
| 2002/0194222 A1 * | 12/2002 | Kaply et al. | 707/513 |
| 2003/0233482 A1 * | 12/2003 | Skrepetos | 709/250 |
| 2004/0216036 A1 * | 10/2004 | Chu et al. | 715/501.1 |
| 2005/0203882 A1 * | 9/2005 | Godley | 707/3 |
| 2006/0282316 A1 | 12/2006 | Snyder | |
| 2006/0288111 A1 | 12/2006 | Katinsky | |
| 2007/0244756 A1 | 10/2007 | Stucki | |
| 2008/0183573 A1 * | 7/2008 | Muschetto | 705/14 |
| 2008/0288492 A1 * | 11/2008 | Gemmell et al. | 707/7 |

* cited by examiner

*Primary Examiner* — Maikhanh Nguyen
(74) *Attorney, Agent, or Firm* — Mark C. Vallone; Amy J. Pattillo (57) ABSTRACT

A rotating content history controller detects a web page from a server over a network, wherein the web page comprises at least a portion of the web page specified for displaying a plurality of pages of rotating content within at least one rotating content space within the web page. The rotating content history controller stores the plurality of pages of rotating content. The rotating content history controller updates a history display interface to comprise a separate selectable option for each of the plurality of pages of rotating content. In addition, responsive to a user selection of a particular one of the separate selectable options, the rotating content history controller displays the particular page of rotating content within a web page display interface, such that a user may selectively access the rotating content independent of a web page display of the rotating content.

17 Claims, 3 Drawing Sheets

MANAGEMENT OF ROTATING BROWSER CONTENT

BACKGROUND

1. Technical Field

The present invention relates in general to management of browser content and more specifically to managing historical caching and retrieval of dynamic, rotating browser content.

2. Description of the Related Art

Web pages, distributed by computing systems over networks, have become an important medium for communicating information to people all over the world. In an effort to maximize the amount of information communicated within the display area of a web page, web pages may include one or more spaces programmed to instruct a browser or other application to dynamically rotate the content displayed within the space. In one example, a web page may include a rotating content space through a JavaScript attached to the web page for specifying instructions for a browser to rotate the content displayed within a particular space of a web page, as the browser reads and displays the web page.

While inserting rotating content into a web page may increase the amount of content a web page owner can display with the web page, the actual effectiveness of a user interacting with rotating content may vary based on the user accessing the web page. For example, among multiple users viewing a web page with rotating content, the effectiveness of rotating content may diminish as some users will perceive the content as rotating too quickly and other users will perceive the content as rotating too slowly. In another example of diminishing effectiveness of rotating content, a user may wish to review already displayed content within the rotation, but the user may lose interest while waiting for the rotation of content to reach the desired content and move to another task.

SUMMARY

Therefore, in view of the foregoing, there is a need for management of rotating browser content, and in particular a need for a method, system, and computer program product for caching and retrieving rotating content for a user to selectively access the rotating content independent of the web page display of the rotating content.

In one embodiment, in a method, system, and program for managing rotating web page content, a rotating content history controller detects a web page from a server over a network, wherein the web page comprises at least a portion of the web page specified for displaying a plurality of pages of rotating content within at least one rotating content space within the web page. The rotating content history controller stores the plurality of pages of rotating content. The rotating content history controller updates a history display interface to comprise a separate selectable option for each of the plurality of pages of rotating content. In addition, responsive to a user selection of a particular one of the separate selection options, the rotating content history controller displays the particular page of rotating content within a web page display interface, such that a user may selectively access the rotating content independent of a web page display of the rotating content.

In detecting a web page with at least one rotating content space, the rotating content history controller detects a script with a plurality of instructions for directing a display of the plurality of pages of rotating content in a particular order at a particular rate within the at least one rotating content space. Independent of the scripts of the web page, responsive to the user selection of a particular one of the separate selection options while the web page is concurrently displayed within a browser window interface, the rotating content history controller directs a web browser to display only the particular page of rotating content within at least one rotating content space of the web page.

Responsive to the web page comprising a plurality of separate rotating content spaces, updating the history display interface with a separate folder for a selection of the plurality of pages of rotating content for each separate rotating content space.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

Figure 1:
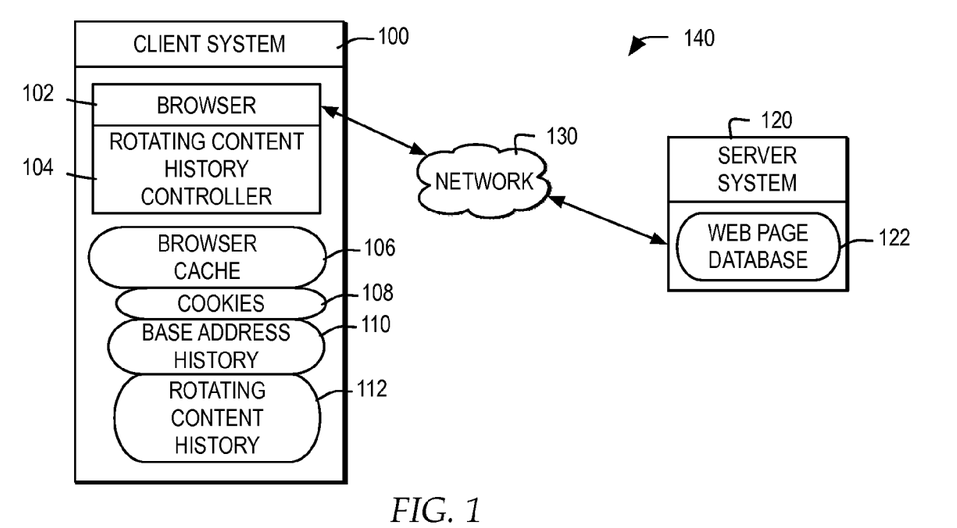
FIG. 1 is a block diagram depicting one embodiment of a network environment for managing rotating browser content.

Referring now to FIG. 1, a block diagram depicts one embodiment of a network environment for managing rotating browser content. In the example, in a network environment 140, a network 130 communicatively connects multiple systems, such as client system 100 and server 120. Network 130 may include, but is not limited to, one or more packet-switching network, such as the Internet or an intranet, and one or more telephony networks. In addition, network 130 may include routers, switches, gateways, and other hardware to enable a communication channel between client system 100 and server system 120. Further, while in the example client system 100 and server system 120 are depicted as communicating via network 130, in an alternate embodiment, one or more of the systems may be incorporated within network 130 and other types of communication mediums may communicatively connect clients system 100 and server system 120.

In the example, client system 100 includes a browser 102. Browser 102 detects a client-side request for a web page at client system 100 and, using one or more protocols, such as Hypertext Transfer Protocol (HTTP), browser 102 makes requests for the web page from one or more server systems, such as server system 120, via network 130. It will be understood that browser 102 may be integrated into an operating system or other application on client system 100, may function as a stand-alone application, or may be implemented as a helper application or other type application that facilitates access to and display of web pages.

Server system 120 includes web page database 122. In response to receiving a web page request from a client system, such as client system 100, server system 120 accesses the requested web page from web page database 122 and returns the accessed data for the requested web page to client system 100 via network 130. A web page, as stored in web page database 122, may include one or more data files, in one or more protocols, associated scripts, and content, such as data files and image files. In one example, a web page may include a HyperText Markup Language file for specifying a base web page with an associated script, such as JavaScript, and attached image files, for specifying a rotating content space within the base web page.

Browser 102 receives the files, scripts and content for a requested web page, interprets the files, scripts and content for the requested web page, and displays the interpreted web page to the user in a web page display interface. In one example, browser 102 may also include modules to enable browser 102 to interpret multiple types of scripting languages in one or more protocols, such as a module for interpreting a script for placing content within a web page within a rotating content space and for directing rotation of the content within the rotating content space.

In the example, client system 100 also includes a rotating content history controller 104 for managing the caching, organization, and retrieval of rotating content from accessed web pages. Rotating content history controller 104 may be a module or plug-in of browser 102 or may be a stand alone application from browser 102. In addition, rotating content history controller 104 may monitor and manage rotating content history caching, organization, and retrieval for web page accessed by a single browser application within client system 100 or across multiple browser applications running on or accessed by client system 100.

Client system 100 includes a browser cache 106 for storing a history of web page requests and web page accesses by browser 100. In the example, as browser 100 stores a history of web page requests and web page accesses, browser cache 106 may include cookies 108 generated from user registration or visits to a web page and base web page address history 110, which may include, but is not limited to, accessed web page links and the cached web pages, including the underlying web page files, scripts, and content.

In particular, as browser 102 receives web pages, rotating content history controller 104 monitors web pages accessed by browser 102 for one or more of scripts for specifying a rotating content space and content for display within a rotating content space of a web page. In response to detecting a script for a rotating content space or content which is effectively rotated within a particular content space, rotating content history controller 104 controls caching of the rotating content within rotating content history 112.

In the example, rotating content history controller 112 may monitor for specific types of scripts that explicitly control a rotating content space and rotating content history controller 112 may monitor for content received with a web page that is marked as rotating content. In addition, rotating content history controller 112 may monitor a web page displayed by browser 102 to detect scripts or placement of content that effectively create a space within a web page in which the content in the space of the web page is automatically rotated to different content or the content within the space dynamically changes. In particular, rotating content may include, but is not limited to, content displayed on a web page that would otherwise only be accessible as automatically rotated by a script within a rotating content space of a web page.

Rotating content history controller 104 organizes the rotating content cached in rotating content history 112 into selectable content options, separate from the rotating content space of the web page originally including the rotating content. In one example, rotating content history controller 104 may display the selectable content options as links in a window, the user selection of which, triggers rotating content history controller 104 to retrieve the selected rotating content associated with a selected link from rotating content history 112 and enable display of the selected rotating content within a web page display interface. In addition, in another example, rotating content history controller 104 may integrate the selectable rotating content options into a display interface that also displays selectable content links for selectable content options from base address history 110.

Figure 2:
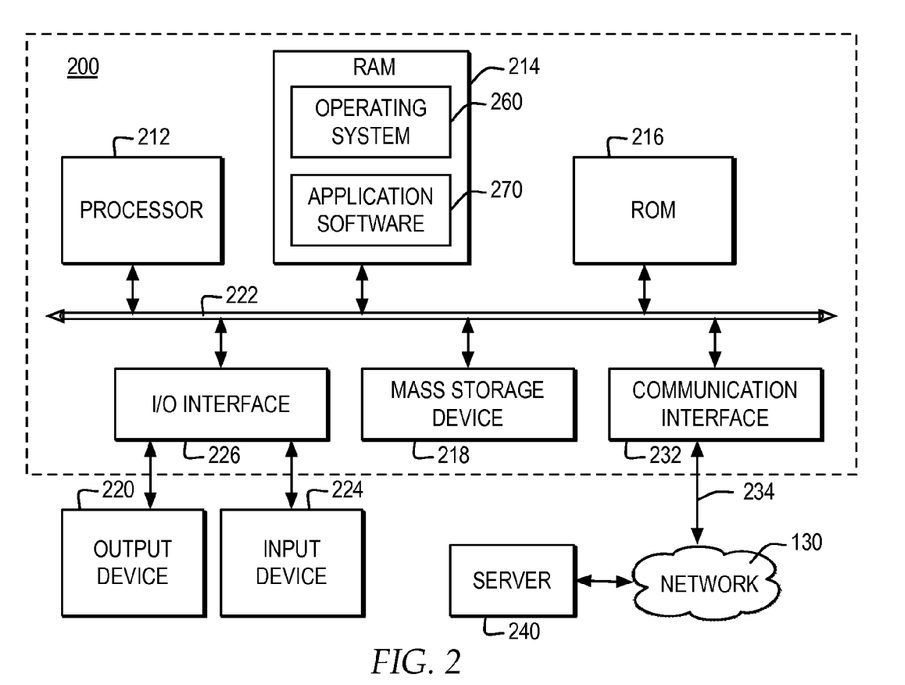
FIG. 2 is a block diagram illustrating an example of a computer system in which the present invention may be implemented.

With reference now to FIG. 2, a block diagram illustrates an example of a computer system in which the present invention may be implemented. The present invention may be executed in a variety of systems and combinations of systems, made up of functional components, such as the functional components described with reference to computer system 200 and may be communicatively connected to a network, such as network 130.

Computer system 200 includes a bus 222 or other communication device for communicating information within computer system 200, and at least one processing device such as processor 212, coupled to bus 222 for processing information. Bus 222 preferably includes low-latency and higher latency paths that are connected by bridges and adapters and controlled within computer system 200 by multiple bus controllers. When implemented as a server, computer system 200 may include multiple processors designed to improve network servicing power. Where multiple processors share bus 222, additional controllers (not depicted) for managing bus access and locks may be implemented.

Processor 212 may be a general-purpose processor such as IBM's PowerPC (PowerPC is a registered trademark of International Business Machines Corporation) processor that, during normal operation, processes data under the control of an operating system 260, application software 270, middleware (not depicted), and other code accessible from a dynamic storage device such as random access memory (RAM) 214, a static storage device such as Read Only Memory (ROM) 216, a data storage device, such as mass storage device 218, or other data storage medium. In one embodiment, the operations performed by processor 212 may control management of content displayed on portable, content adjustable identification devices as depicted in the operations of flowchart of FIG. 5 and other operations described herein. Operations performed by processor 212 may be requested by operating system 260, application software 270, middleware or other code or the steps of the present invention might be performed by specific hardware components that contain hardwired logic for performing the steps, or by any combination of programmed computer components and custom hardware components.

As will be appreciate by one skilled in the art, the present invention may be embodied as a system, method or computer program product. Accordingly, the present invention may take the form of an entirely hardware embodiment, an entirely software embodiment (including firmware, resident software, micro-code, etc) or an embodiment containing software and hardware aspects that may all generally be referred to herein as "circuit," "module," or "system." Furthermore, the present invention may take the form of a computer program product embodied on any tangible medium of expression having computer-usable program code embodied in the medium.

Any combination of one or more computer usable or computer readable medium(s) may be utilized. The computer-usable or computer-readable medium may be, for example, but not limited to, a data storage device. More specific examples (a non-exhaustive list) of the computer-readable medium would include the following: a portable computer diskette, a hard disk, such as mass storage device 218, a random access memory (RAM), such as RAM 214, a read-only memory (ROM), an erasable programmable read-only memory (EPROM or Flash memory), a portable compact disc read-only memory (CDROM), an optical storage device. In the context of this document, a computer-usable or computer-readable medium may be any medium that can store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, such as computer system 200, partly on the user's computer, as a stand-alone software package, partly on the user's computer and partly on a remote computer or entirely on the remote computer or server, such as a server 240. In the latter scenario, the remote computer may be connected to the user's computer through any type of network, such as network 130, through a communication interface 232 over a network link 234, that may be connected, for example, to network 130 including a local area network (LAN) or a wide area network (WAN), or the connection may be made to an external computer (for example, through the Internet using an Internet Service Provider). Although not depicted, communication interface 232 may include software, such as device drivers, hardware, such as adapters, and other controllers that enable communication. When implemented as a server, computer system 200 may include multiple communication interfaces accessible via multiple peripheral component interconnect (PCI) bus bridges connected to an input/output controller, for example. In this manner, computer system 200 allows connections to multiple clients via multiple separate ports and each port may also support multiple connections to multiple clients.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 200, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 200, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network link 234 and network 130 both use electrical, electromagnetic, or optical signals that carry digital data streams. The signals through the various networks and the signals on network link 234 and through communication interface 232, which carry the digital data to and from computer system 200, may be forms of carrier waves transporting the information.

In addition, computer system 200 may include multiple peripheral components that facilitate input and output. These peripheral components are connected to multiple controllers, adapters, and expansion slots, such as input/output (I/O) interface 226, coupled to one of the multiple levels of bus 222. For example, input device 224 may include, for example, a microphone, a video capture device, a body scanning system, a keyboard, a mouse, or other input peripheral device, communicatively enabled on bus 222 via I/O interface 226 controlling inputs. In addition, for example, a display device 220 communicatively enabled on bus 222 via I/O interface 226 for controlling outputs may include, for example, one or more graphical display devices, audio speakers, printers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 2 may vary. Furthermore, those of ordinary skill in the art will appreciate that the depicted example is not meant to imply architectural limitations with respect to the present invention.

Figure 3:
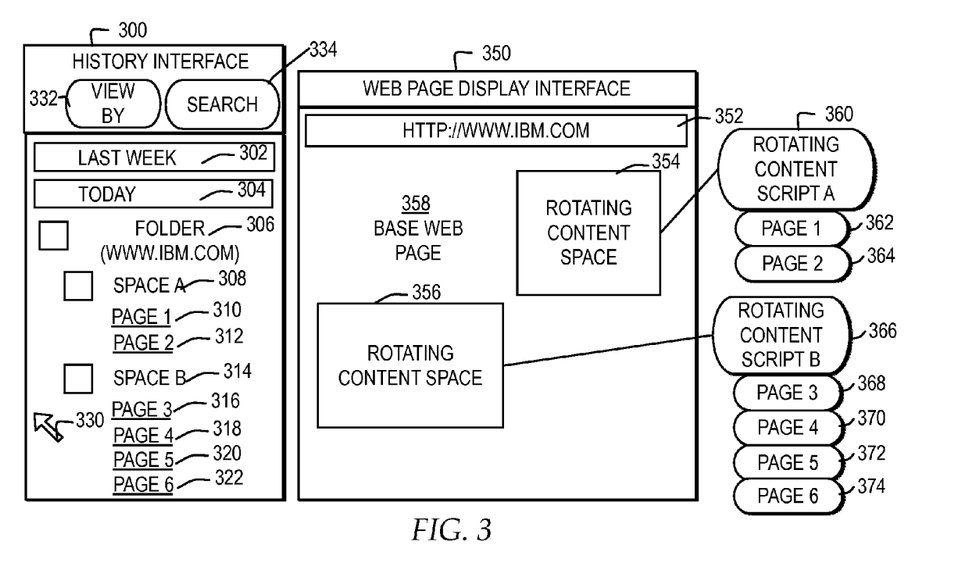
FIG. 3 is a block diagram depicting a user interface for display of a web page with rotating content and for management of the organization of separate selectable options for accessing the rotating content.

Referring now to FIG. 3, a block diagram illustrates a user interface for display of a web page with rotating content and for management of the organization of separate selectable options for accessing the rotating content. In the example a web page display interface 350 includes a rendering of a web page, accessed from the address illustrated at reference numeral 352, interpreted as a base web page 358 with rotating content space 354 and rotating content space 356. It will be understood that a web page may include one or more rotating content spaces.

Rotating content space 354 is driven by a rotating content script A at reference numeral 360, with the rotating content applied to the space by rotating content script A illustrated as "page 1" at reference numeral 362 and "page 2" at reference numeral 364. Rotating content space 356 is driven by a rotating content script B at reference numeral 366, with the rotating content applied to the space by rotating content script B illustrated as "page 3" at reference numeral 368, "page 4" at reference numeral 370, "page 5" at reference numeral 372, and "page 6" at reference numeral 374. Each of rotating content script A and rotating content script B may separately specify the order and rate of rotation of the content within the respective spaces.

In the example, rotating content history controller 104 detects that rotating content space 354 and rotating content space 356 qualify as rotating content spaces with content that automatically rotates within fixed spaces of base web page 358. In response to detecting the rotating content space, rotating content history controller 104 caches rotating content history 112 with "page 1" and "page 2" associated with rotating content space 354 and with "page 3", "page 4", "page 5", and "page 6" associated with rotating content space 356. In addition, rotating content history controller 104 may also cache rotating content script A and rotating content script B.

As rotating content history controller 104 caches rotating content, rotating content history controller 104 also updates a selectable history interface 300. In the example, selectable history interface 300 provides selectable content options for a user to select from, to selectively access rotating content that would otherwise only be accessible as automatically rotated by a script within rotating content spaces 354 and 356 of web page 358.

In the example depicted of selectable history interface 300, selectable content options are rotating content links organized in the order that the rotating content is cached, including a file of selectable content options from "last week" illustrated at reference numeral 302 and a file of selectable content options from "today" illustrated at reference numeral 304. As illustrated at reference numeral 306, in addition to cataloging selectable content options in the order that the rotating content is cached, a folder may specify web address of the accessed web page including rotating content and as illustrated at reference numerals 308 and 314 the web page folder may include a separate sub-folder for each rotating content space. The folder for "space A" as illustrated at reference numeral 308 includes, in the example, a selectable link to "page 1" at reference numeral 310 and a selectable link to "page 2" at reference numeral 312, where "page 1" and "page 2" are rotating content otherwise only accessible as automatically rotated by rotating content script A in rotating content space 354. The folder for "space B" as illustrated at reference numeral 314 includes, in the example, a selectable link to "page 3" at reference numeral 368, "page 4" at reference numeral 370, "page 5" at reference numeral 372, and "page 6" at reference numeral 374.

While in the example the selectable content options are displayed as rotating content links the order that the rotating content is cached, a user may also select, through "view by" option 332 to arrange the view of the selectable content options according to other criteria, such as by size, by type of content, or other criteria. In addition, a user may select through "search" option 334 to search through the selection content options by keyword, size, type of content, or other criteria. Moreover, using a separate option button or through other inputs within history interface 300, a user may select to delete individual selectable content options or all of the historical content. In addition, rotating content history controller 104 may be configured by the user to periodically remove individual selectable content options from history interface 300 according to specified criteria, such as a set number of days.

While in the example the selectable content options are under a folder and sub-folder view, it will be understood that other organizational hierarchies may be implemented for displaying the selectable content options. Additionally, rotating content history controller 104 may include a selectable option for opening and closing selectable history interface 300 or a user may select to open or close selectable history interface 300 from a selectable option within web page display interface 350.

In one example, a user may select from among the selectable rotating content options illustrated at reference numerals 310, 312, 316, 318, 320, and 322, and in response to a user selection of a particular rotating content link, rotating content history controller 104 directs browser 102 to fill the associated rotating content space with the rotating content specified by the selected link. For example, if a user selects "page 3" at reference numeral 316 through placement of point 330 over the link for "page 3" and selection of the link, then rotating content history controller 104 may direct browser 102 to fill rotating content space 356 with the cached content for "page 3".

Figure 4:
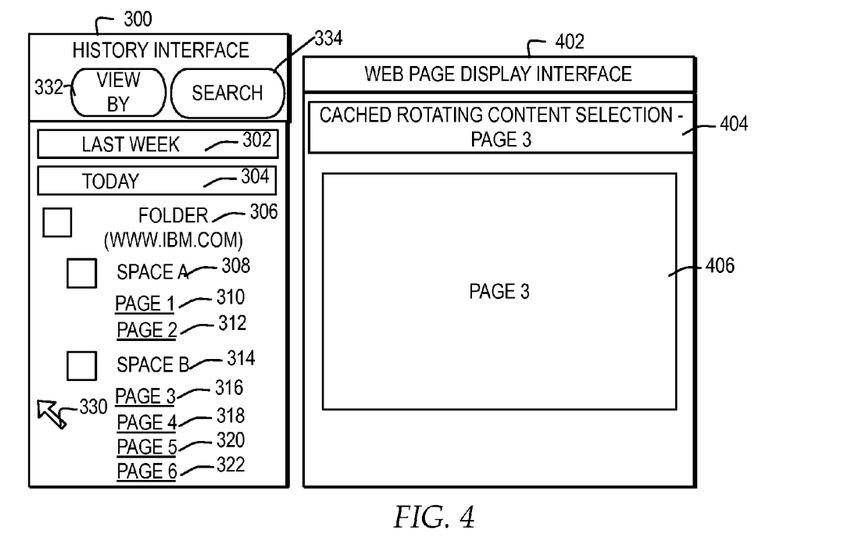
FIG. 4 is a user interface displaying cached rotating content responsive to a user selection of a rotating content selectable link.

In another example, FIG. 4 illustrates a web page display interface displaying cached rotating content, responsive to a user selection of a rotating content selectable link. In the example, a user may select from among the selectable rotating content links illustrated at reference numerals 310, 312, 316, 318, 320, and 322, and in response to a user selection of a particular rotating content link, rotating content history controller 104 directs browser 102 to display the rotating content specified by the selected link in a web page display interface 402. In the example, as illustrated at reference numeral 404, web page display interface 402 displays "page 3" 406 of the rotating content cached when the user accessed base web page 358 illustrated in FIG. 3. By enabling a user to selectively view rotating content upon user selection of a rotating content link, the user is enabled to decide how and when to view content that is originally programmed for viewing only when automatically rotated within rotating content space of a web page.

Figure 5:
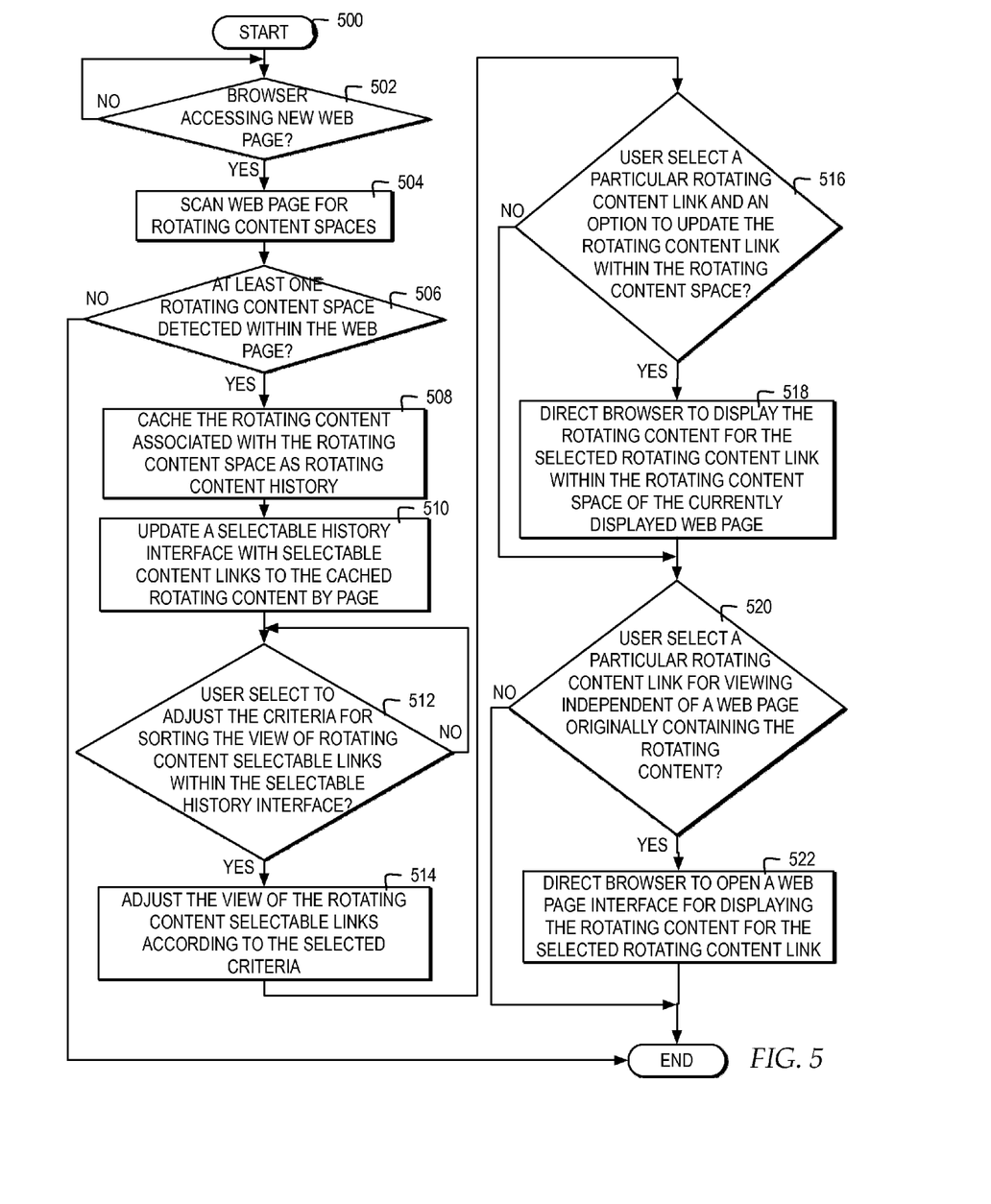
FIG. 5 is a high level logic flowchart depicting a process and program for managing rotating browser content.

With reference now to FIG. 5, a high level logic flowchart depicts a process and program for managing rotating browser content. In the example, the process starts at block 500 and thereafter proceeds to block 502. Block 502 illustrates a determination whether a rotating content history controller detects a browser accessing a new web page. If the rotating content history controller detects a browser accessing a new web page, then the process passes to block 504. Block 504 illustrates scanning a web page for rotating content spaces. Next, block 506 depicts a determination whether at least one rotating content space is detected within the web page. If there is at least one rotating content space detected within the web page, then the process passes to block 508, otherwise the process ends.

Block 508 illustrates caching the rotating content associated with the rotating content space in the rotating content history. Next, block 510 depicts updating a selectable history interface with selectable content links to the cached rotating content by page. Thereafter, block 512 illustrates a determination whether the user selects to adjust the criteria for sorting the view of the rotating content selectable links within the selectable history interface. If the user selects to adjust the criteria, then the process passes to block 514. Block 514 depicts adjusting the view of the rotating content selectable links according to the selected criteria, and the process passes to block 516. If the user does not select to adjust the criteria at block 512, then the process passes to block 516.

Block 516 depicts a determination whether a user selects a particular rotating content link and an option to update the rotating content link within the rotating content space. If the user selects a particular rotating content link and an option to update the rotating content link within the rotating content space, then the process passes to block 518. Block 518 illustrates directing the browser to display only the rotating content associated with the selected rotating content link within the rotating content space of the currently displayed web page, thereby overriding any scripts for directing rotation of content within the rotating content space.

Block 520 illustrates a determination whether a user selects a particular rotating content link for viewing independent of a web page originally containing the rotating content. If a user selects a particular rotating content link for viewing independent of a web page originally containing the rotating content, then the process passes to block 522. Block 522 depicts directing the browser to open a web page display interface displaying the rotating content for the selected rotating content link, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method in at least one computer system for managing rotating web page content, the method comprising the steps of:
    a computer detecting a web page from a server over a network, wherein the web page comprises at least two portions of the web page each specified for displaying a separate selection of a plurality of pages of rotating content within at least two rotating content spaces within a display of the web page;
    the computer storing the plurality of pages of rotating content specified according to an identifier for the web page and specified according to a separate identifier for each rotating content space from among the at least two rotating content spaces;
    the computer updating a history display interface to comprise a separate selectable option for each of the plurality of pages of rotating content displayed in a folder specified by the identifier for the web page and further specified by each separate identifier for each rotating content space from among the at least two rotating content spaces;
    the computer, responsive to a user selection of a particular one of the separate selectable options, directing a browser to open a separate display interface for displaying the particular page of rotating content only within the separate display interface;
    the computer displaying within the history display interface a selectable delete option button; and
    the computer, responsive to a first user selection of an additional particular one of the separate selectable options for each of the plurality of pages of rotating content displayed in the folder and a second user selection of the selectable delete option button, removing the additional particular one of the separate selectable options from the history display interface.

2. The method according to claim 1, further comprising:
    the computer displaying, by the browser, the web page within a next web page display interface separate from the history display interface and the separate display interface.

3. The method according to claim 1, wherein the computer detecting a web page from a server over a network, wherein the web page comprises at least two portions of the web page each specified for displaying a separate selection of a plurality of pages of rotating content within at least two rotating content spaces within a display of the web page, further comprises:
    the computer detecting a script with a plurality of instructions for directing a display of the plurality of pages of rotating content in a particular order at a particular rate within at least one of the at least two rotating content spaces.

4. The method according to claim 1, wherein updating a history display interface to comprise a separate selectable option for each of the plurality of pages of rotating content displayed in a folder specified by the identifier for the web page and further specified by each separate identifier for each rotating content space from among the at least two rotating content spaces, further comprises:
    the computer updating the history display interface comprising a folder representing each separate web page previously accessed at the computer in the order accessed to display a next folder for a currently received web page and a separate selectable link for each of the plurality of pages of rotating content.

5. The method according to claim 1, wherein the computer updating a history display interface of the at least one computer system to comprise a separate selectable option for each of the plurality of pages of rotating content displayed in a folder specified by the identifier for the web page and further specified by each separate identifier for each rotating content space from among the at least two rotating content spaces, further comprises:
    the computer updating the history display interface with a separate rotating content space folder under the folder specified by the identifier for the web page for a selection of the plurality of pages of rotating content for each separate rotating content space from among the at least two rotating content spaces.

6. The method according to claim 1, further comprising:
the computer, responsive to receiving a user request of a criteria for sorting a plurality of listings in the history display interface, adjusting a hierarchical ordering of a plurality of separate selectable options according to the criteria.

7. The method according to claim 1, further comprising, the computer, responsive to a user selection from a browser application window to open the history display interface, opening the history display interface.

8. A system for managing rotating web page content, comprising:
one or more processors, one or more computer-readable memories and one or more computer-readable, tangible storage devices;
program instructions, stored on at least one of the one or more storage devices for execution by at least one of the one or more processors via at least one of the one or more memories, to detect a web page from a server over a network, wherein the web page comprises at least two portions of the web page specified for displaying a separate selection of a plurality of pages of rotating content within at least two rotating content spaces within a display of the web page;
program instructions, stored on at least one of the one or more storage devices for execution by at least one of the one or more processors via at least one of the one or more memories, to store the plurality of pages of rotating content in a memory specified according to an identifier for the web page and specified according to a separate identifier for each rotating content space from among the at least two rotating content spaces;
program instructions, stored on at least one of the one or more storage devices for execution by at least one of the one or more processors via at least one of the one or more memories, to modify a history display interface to comprise a separate selectable option for each of the plurality of pages of rotating content displayed in a folder specified by the identifier for the web page and further specified by each separate identifier for each rotating content space from among the at least two rotating content spaces;
program instructions, stored on at least one of the one or more storage devices for execution by at least one of the one or more processors via at least one of the one or more memories, to direct a browser to open a separate display interface to display a particular page of rotating content only, responsive to a user selection of the particular one of the separate selectable options from the history display interface;
program instructions, stored on at least one of the one or more storage devices for execution by at least one of the one or more processors via at least one of the one or more memories, to display within the history display interface a selectable delete option button; and
program instructions, stored on at least one of the one or more storage devices for execution by at least one of the one or more processors via at least one of the one or more memories, responsive to a first user selection of an additional particular one of the separate selectable options for each of the plurality of pages of rotating content displayed in the folder and a second user selection of the selectable delete option button, to remove the additional particular one of the separate selectable options from the history display interface.

9. The system according to claim 8, wherein:
program instructions, stored on at least one of the one or more storage devices for execution by at least one of the one or more processors via at least one of the one or more memories, to display the web page separate from the history display interface and the separate display interface.

10. The system according to claim 8, wherein:
program instructions, stored on at least one of the one or more storage devices for execution by at least one of the one or more processors via at least one of the one or more memories, to detect a script with a plurality of instructions for directing a display of the plurality of pages of rotating content in a particular order at a particular rate within at least one of the at least two rotating content spaces.

11. The system according to claim 8, wherein:
program instructions, stored on at least one of the one or more storage devices for execution by at least one of the one or more processors via at least one of the one or more memories, to update the history display interface comprising a folder representing each separate web page previously accessed in the order accessed to display a next folder for a currently received web page and a separate selectable link for each of the plurality of pages of rotating content.

12. The system according to claim 8, wherein:
program instructions, stored on at least one of the one or more storage devices for execution by at least one of the one or more processors via at least one of the one or more memories, to update the history display interface with a separate rotating content space folder under the folder specified by the identifier for the web page for a selection of the plurality of pages of rotating content for each separate rotating content space from among the at least two rotating content spaces.

13. The system according to claim 8, wherein:
program instructions, stored on at least one of the one or more storage devices for execution by at least one of the one or more processors via at least one of the one or more memories, responsive to receiving a user request of a criteria for sorting a plurality of listings in the history display interface, to adjust a hierarchical ordering of a plurality of separate selectable options according to the criteria.

14. The system according to claim 8, wherein:
program instructions, stored on at least one of the one or more storage devices for execution by at least one of the one or more processors via at least one of the one or more memories, responsive to a user selection from a browser application window to open the history display interface, to open the history display interface.

15. A computer program product for managing rotating web page content, the computer program product comprising:
one or more computer-readable hardware storage devices;
program instructions, stored on at least one of the one or more devices, to detect a web page from a server over a network, wherein the web page comprises at least two portions of the web page each specified for displaying a separate selection of a plurality of pages of rotating content within at least two rotating content spaces within a display of the web page;

program instructions, stored on at least one of the one or more devices, to store the plurality of pages of rotating content in a memory specified according to an identifier for the web page and specified according to a separate identifier for each rotating content space from among the at least two rotating content spaces;

program instructions, stored on at least one of the one or more devices, to update a history display interface to comprise a separate selectable option for each of the plurality of pages of rotating content displayed in a folder specified by the identifier for the web page and further specified by each separate identifier for each rotating content space from among the at least two rotating content spaces;

program instructions, stored on at least one of the one or more devices, responsive to a user selection of a particular one of the separate selectable options from the history display interface, to direct a browser to open a separate display interface to display the particular page of rotating content within a separate display interface;

program instructions, stored on at least one of the one or more storage devices for execution by at least one of the one or more processors via at least one of the one or more memories, to display within the history display interface a selectable delete option button; and program instructions, stored on at least one of the one or more storage devices for execution by at least one of the one or more processors via at least one of the one or more memories, responsive to a first user selection of an additional particular one of the separate selectable options for each of the plurality of pages of rotating content displayed in the folder and a second user selection of the selectable delete option button, to remove the additional particular one of the separate selectable options from the history display interface.

16. The computer program product according to claim 15 further comprising instructions, stored on at least one of the one or more devices, to display the web page within a next web page display interface separate from the history display interface and the separate display interface.

17. The computer program product according to claim 15 further comprising instructions, stored on at least one of the one or more devices, to detect a script with a plurality of instructions for directing a display of the plurality of pages of rotating content in a particular order at a particular rate within at least one of the at least two rotating content spaces.

* * * * *